July 18, 1950        G. R. BROUGHER        2,515,856
TRAILER HITCH
Filed Aug. 24, 1946
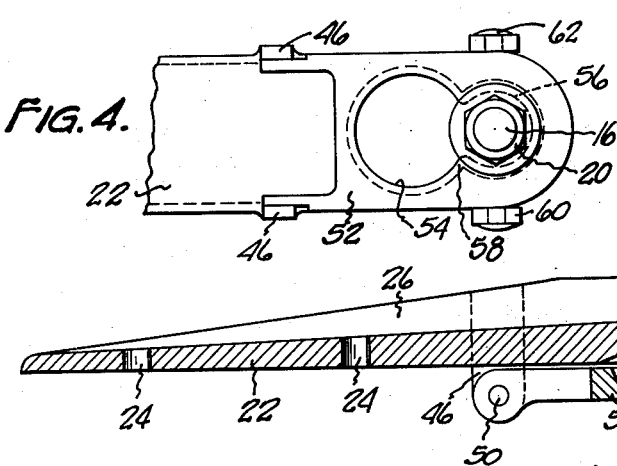
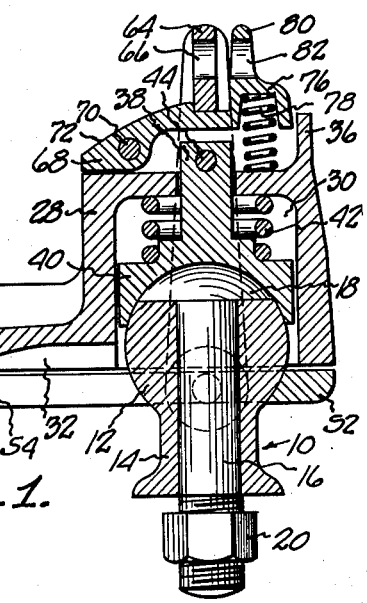
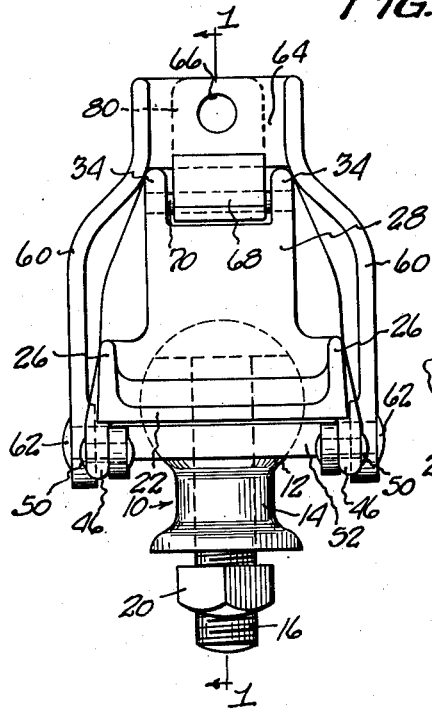
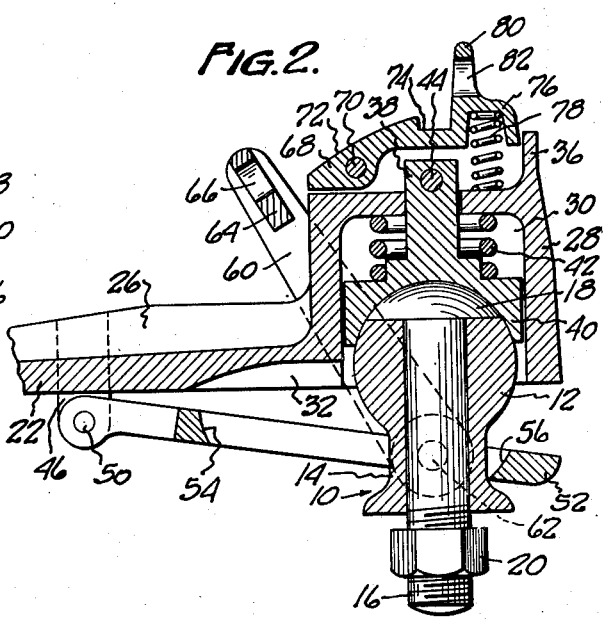
INVENTOR
GEORGE R. BROUGHER.
BY Altsch + Knoblock
ATTORNEYS.

Patented July 18, 1950

2,515,856

UNITED STATES PATENT OFFICE 2,515,856

TRAILER HITCH

George R. Brougher, Bremen, Ind.; Grace M. Brougher, administratrix of said George R. Brougher, deceased, assignor, by mesne assignments, to The Dalton Engineering Corporation, Warsaw, Ind., a corporation of Indiana Application August 24, 1946, Serial No. 692,789

9 Claims. (Cl. 280—33.17)

This invention relates to improvements in trailer hitches, and more particularly to hitches for use in connecting house trailers and small utility trailers to automobiles.

The primary object is to provide a device of this character by means of which a trailer may be connected to a tractive vehicle and disconnected therefrom easily and quickly and with minimum manipulation of parts.

A further object is to provide a trailer hitch which accommodates relative turning of tractive and towed vehicles and which constitutes a positive lock between the tractive and towed vehicles and at the same time is readily and easily detachable.

A further object is to provide a hitch of this character with means providing a yielding bearing engagement of the interfitting parts which are always under tension when interfitted so that rattle and play of the interfitted parts is avoided.

A further object is to provide a hitch of this character with a novel retainer for a king-pin and with novel means for controlling the position of the retainer in operative locking position.

A further object is to provide a device of this character with means which will permit the use of a padlock to prevent unauthorized release of the hitch.

Other objects will be apparent from the following specification.

In the drawing:

Fig. 1 is a longitudinal vertical sectional view of the device taken on line 1—1 of Fig. 3.

Fig. 2 is a fragmentary longitudinal vertical sectional view similar to Fig. 1 but illustrating the parts at an intermediate partially released position.

Fig. 3 is an end view of the device as viewed from the left in Fig. 1.

Fig. 4 is a fragmentary bottom plan view of the device.

Referring to the drawings which illustrate the preferred embodiment of the invention, the numeral 10 designates a king-pin having a body portion provided with a central bore. The upper portion 12 of the body provides a part-spherical head, and the lower portion of the body has a reduced neck or shank portion 14. A bolt 16 extends through the bore with its head 18 forming a continuation of the head 12 to complete a spherical form. A nut 20 is threaded on the bolt 16 and provides means by which the king-pin can be secured to a suitable support on a tractive vehicle such as an automobile (not shown).

The hitch member which cooperates with the king-pin 10 is adapted to be mounted upon the vehicle, such as a trailer to be towed, as by mounting the same upon a tongue projecting forwardly therefrom. An elongated plate 22 is provided with a plurality of openings 24 for the reception of suitable securing means, said plate being adapted to bear upon the trailer tongue (not shown). Plate 22 is elongated and is preferably reinforced by longitudinal ribs 26 at its opposite sides. At one end the plate 22 has integrally formed therewith an upwardly projecting inverted socket or dome-shaped portion 28 having a cavity 30 of a size to receive the head 12 of the king-pin with clearance and being open at its bottom end. The bottom face of the plate 22 is preferably grooved at 32 adjacent to the socket for purposes to be referred to hereafter. The top of the dome portion 28 is preferably provided with a pair of flanges 34 at opposite sides thereof and with a flange 36 at the forward end thereof.

The top wall of the dome portion 28 has an opening therein which slidably receives an elongated stem portion or neck 38 of rigid construction whose lower end mounts an enlarged bearing member 40 for a sliding guided fit within the cavity 30. A coil spring 42 is interposed between the bearing member 40 and the top wall of the socket 28 and urges the bearing member downwardly to the limit permitted by a cross-pin 44 carried by the upper end of the neck 38 and normally bearing against the top surface of the dome 28. The bottom surface of the bearing member 40 is of part-spherical socketed form adapted for snug reception of the upper portion of the spherical head of the king-pin.

A pair of ears 46 depend from opposite sides of the plate 22 in rearwardly spaced relation to the dome portion 28 and pivot pins or rivets 50 are supported thereby and serve to pivotally connect an elongated plate 52 to the plate 22. The plate 52 has a keyhole type of opening formed therein, as best seen in Fig. 4, constituting a large diameter opening 54 of a size to permit the spherical head 12 of the king-pin 10 to pass therethrough. A smaller opening 56 of a size to fit snugly around the bottom portion of the head 12 of the king-pin is provided in axial vertical alignment with the socket portion of the bearing member 40. The openings 54 and 56 communicate with each other through a restricted neck portion 58, best seen in Fig. 4.

A yoke 60, whose arms are pivoted at 62 to the opposite sides of the plate 52 in substantially vertical alignment with the neck 38, has a wide vertical cross web 64 at its upper end provided with a central aperture 66. The cross web 64 has its inner edge spaced from the pivot axis 62 of the yoke by such a dimension that when the plate 52 is in substantially parallel relation to the bottom surface of the plate 22, the bottom edge of the web 64 will extend with clearance above the flanges 34, as illustrated in Fig. 3.

A latch member 68 fits within the space defined by the flanges 34 and 36 and is pivoted to the flanges 34 by the pin 70. The upper surface 72 of the latch member is curved longitudinally whereby the rearmost portion of the latch is substantially tapered. A transverse notch 74 is formed in the top of the latch in vertical alignment with the axis of the king-pin and is adapted to receive the web 64 of the yoke 60. An inverted cup-shaped socket portion 76 is formed at the forward end of the latch 68 and a coil spring 78 seats therein with its lower end bearing against the top wall of the dome member 28. A flange 80 projects upwardly from the latch forwardly of the notch 74 and is provided with an opening 82 therein which is axially aligned with the opening 66 in the yoke web 64 when the parts are in the position illustrated in Fig. 1.

Fig. 1 illustrates the latched position of the parts. The king-pin 10 projects into the socket or dome portion 28 where the bearing member 40 rests thereon. The plate 52 is positioned parallel to the plate 22 with its front opening 56 fitting snugly around the king-pin and thereby preventing separation of the king-pin or relative vertical movement of the king-pin and the bearing member 40. Any weight or stress applied from the trailer through the hitch to the king-pin is sustained by the spring 42 which constantly tensions the bearing engagement between the member 40 and the king-pin and thereby reduces and minimizes rattle or relative play of these parts. The yoke 60 engaging in the notch 74 of the latch member 68 serves as the means for holding the plate 52 in this retaining or locking position. The aligned openings 66 and 82 in the parts 64 and 80, respectively, provide means for the reception of a padlock or other means for locking the device in hitched position. It will be apparent from Fig. 3 that the slight clearance between the bottom of the web 64 with the top of the web 34 forms a stop which prevents longitudinal movement of the yoke when in latching position. In other words, despite the fact that the latch 68 is pivoted and held against the web of the yoke by the pressure of spring 78 so that it alone would not serve to hold the yoke firmly in the Fig. 1 position because of the resilience of the spring, the device is not released because the flanges 34 serve as stops positively to prevent such yielding action or downward movement of the yoke.

When it is desired to release the hitch, the latch member 68 is depressed against the action of the spring 78, thereby freeing the cross web 64 of the yoke from the slot 74 of the latch. The yoke can then be swung to the left as viewed in Fig. 1, which pivotal movement is accommodated by the curved shapes of the upper surfaces of flanges 34 and surface 72 of the latch 68. The yoke is permitted to swing clear of the latch and of the dome portion 28 with its web resting upon the top of the flange 26. Fig. 2 illustrates the position of the yoke after it has been released from the latch 68 and before it is lowered into engagement with the webs 26. In Fig. 2 the retainer plate 52 has been lowered somewhat, whereby the king-pin may be moved from the bearing member 40. The parts are so proportioned that when the web 64 bears upon the flanges 26 the plate 52 will have been swung to an extent permitting the king-pin 10 to be shifted downwardly and rearwardly relative to socket 28 to a position in register with the large diameter opening 54 of the plate 52. For this purpose the slot 32 in the bottom of the plate 22 is of advantage and limits the extent to which the member 52 need be lowered to free the king-pin.

The device has various advantages as will be apparent from the foregoing description, principal among which are ease of operation, strength and rigidity, cushioned bearing between the king-pin and the member 40 with respect to the rigid plate 22 and dome portion 28, and the convenience and simplicity of the latch member 68. The construction overcomes certain disadvantages common in conventional hitch constructions, and, particularly, has the advantage of reducing the manipulation required of the device in order to effect the interlock between the mating or interlocking parts.

While the construction herein described is preferred, it will be understood that changes may be made therein within the scope of the appended claims without departing from the spirit of the invention.

I claim:

1. A hitch member adapted to cooperate with a headed king-pin comprising a body having an upwardly projecting inverted pin receiving socket portion, a slotted retainer pivoted to the bottom of said body at a point spaced from said socket portion, and a yoke pivoted to said retainer and extending around and over said body, said yoke being adapted to be supported by said socket portion to hold said retainer in pin-locking position.

2. A hitch member adapted to cooperate with a headed king-pin comprising a body having an upwardly projecting inverted pin receiving socket portion, a slotted retainer pivoted to the bottom of said body at a point spaced from said socket portion, and a yoke pivoted to said retainer and extending around and over said body, said socket portion having a yoke-receiving seat at its upper end.

3. A hitch member adapted to cooperate with a headed king-pin, comprising a body having an upwardly projecting socket portion open at its bottom to receive said king-pin, an elongated plate pivoted to said body spaced from said socket and adapted to span said socket, said plate having a slot to receive said pin in underlying relation to said head, a yoke pivoted to the free end of said plate, and a spring pressed latch mounted on and positioned above said socket portion for releasably locking said yoke in position to hold said plate in pin-retaining relation to said socket, said yoke being shiftable clear of said socket portion to permit said plate to pivot away from said socket.

4. A hitch member adapted to interlock with a headed king-pin, comprising a body having an inverted upwardly projecting pin-receiving socket portion open at its bottom, a plate pivoted to the bottom of said body adapted to span said socket to retain said pin in said socket, a yoke pivoted to said plate adjacent said socket portion, and a spring pressed latch carried by the top of said socket and engageable with said yoke to hold said plate in socket-spanning position, said yoke being shiftable clear of said socket portion to permit said plate to swing away from said socket to pin-releasing position.

5. A hitch member adapted to interlock with a headed king-pin, comprising a body having an inverted upwardly projecting pin-receiving socket portion open at its bottom, a flange projecting upwardly from said socket portion, a pin-retaining plate pivoted to and positioned at the bottom of the body, a yoke pivoted to said plate and adapted to pass over said flange with small clearance, and an upwardly spring pressed latch engageable by said yoke and carried by the top of said socket portion adjacent to and normally projecting above said flange, said latch being depressible below said rib flange for engagement of said yoke with said flange.

6. A hitch member adapted to interlock with a headed king-pin, comprising a body having an upwardly projecting socket portion open at its bottom, a pin-retaining plate pivoted to and positioned at the bottom of said body, a yoke pivoted to said plate, releasable latching means carried by the top of said socket and engageable by said yoke, said latch means and yoke having flanged portions juxtaposed in locking position and provided with registering apertures.

7. A hitch member adapted to interlock with a headed king-pin, comprising a body having an upwardly projecting socket portion open at its bottom, a bearing member shiftable vertically in said socket and having a reduced dimension upwardly projecting stem and a recessed bottom face adapted to seat on the head of said pin, said socket portion having an opening slidably receiving said stem, a stop carried by the upper end of said stem and engageable with said socket portion to limit downward movement of said member, a coil spring encircling said stem and urging said member downwardly, and releasable means for locking said pin in said socket.

8. A vehicle hitch member adapted to interlock with a headed king-pin, comprising an elongated body adapted to be secured to a vehicle, an upwardly projecting inverted cup-shaped member carried by the outer end of said body and adapted to receive and be supported by the head of said king-pin, an elongated rigid plate pivoted at one end to said body spaced from said member and adapted to extend across the bottom of said member at its free end, said plate having an opening therein concentric with said member to receive the portion of said pin below said head, and release means for locking said plate in pin-retaining position, said plate having a second and larger opening communicating with said first opening and adapted for passage of the head of said pin therethrough when said plate is tilted downwardly from said member.

9. A vehicle hitch member adapted to interlock with a headed king-pin, comprising an elongated body adapted to be secured to a vehicle, an upwardly projecting inverted cup-shaped member carried by the outer end of said body and having a socket adapted to receive and be supported by the head of said king-pin, an elongated rigid plate pivoted at one end to said body spaced from said socket and adapted to extend across the bottom of said socket at its free end, said plate having an opening therein concentric with said socket to receive the portion of said pin below said head, and a yoke pivoted to said plate adjacent to said cup-shaped member and adapted to be suspended from the top of said socket to hold said plate in pin-retaining position, and downwardly spring pressed means shiftable vertically in said member between predetermined limits and bearing upon the head of said pin.

GEORGE R. BROUGHER.

REFERENCES CITED

The following references are of record in the file of this patent:

UNITED STATES PATENTS

| Number | Name | Date |
|---|---|---|
| 1,977,065 | Jacob | Oct. 16, 1934 |
| 2,072,473 | Baumberger | Mar. 2, 1937 |
| 2,326,466 | Kitterman | Aug. 10, 1943 |

FOREIGN PATENTS

| Number | Country | Date |
|---|---|---|
| 584,595 | France | Nov. 22, 1924 |
| 807,880 | France | Oct. 26, 1936 |